(12) United States Patent
Okamoto et al.

(10) Patent No.: US 12,157,477 B2
(45) Date of Patent: Dec. 3, 2024

(54) VEHICLE CONTROL SYSTEM AND VEHICLE CONTROL METHOD

(71) Applicant: TOYOTA JIDOSHA KABUSHIKI KAISHA, Toyota (JP)

(72) Inventors: Yuki Okamoto, Hadano (JP); Yoshinori Watanabe, Isehara (JP); Sho Amagai, Susono (JP); Atsushi Sone, Susono (JP); Atsushi Kodama, Shizuoka-ken (JP); Kosuke Futagami, Mishima (JP); Yosuke Hirate, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 17/977,024

(22) Filed: Oct. 31, 2022

(65) Prior Publication Data

US 2023/0135494 A1    May 4, 2023

(30) Foreign Application Priority Data

Nov. 4, 2021   (JP) .................................. 2021-180337

(51) Int. Cl.
  *B60W 50/02*   (2012.01)
(52) U.S. Cl.
  CPC .................................. *B60W 50/02* (2013.01)
(58) Field of Classification Search
  CPC .................................................. B60W 50/02
  See application file for complete search history.

(56) References Cited

U.S. PATENT DOCUMENTS

| | | | |
|---|---|---|---|
| 8,255,110 B2 | 8/2012 | Taguchi | |
| 8,364,394 B2 | 1/2013 | Taguchi | |
| 8,428,812 B2 | 4/2013 | Taguchi | |
| 8,660,778 B2 | 2/2014 | Taguchi | |
| 9,067,571 B2 | 6/2015 | Matsunaga | |
| 9,096,266 B2 | 8/2015 | Irie | |
| 9,352,779 B2 | 5/2016 | Kindo et al. | |
| 9,886,852 B2 | 2/2018 | Urano | |
| 10,048,699 B2 | 8/2018 | Inoue et al. | |
| 2016/0313738 A1 | 10/2016 | Kindo et al. | |
| 2019/0302763 A1 | 10/2019 | Kondo et al. | |
| 2020/0339152 A1 | 10/2020 | Inoue et al. | |
| 2020/0348682 A1 | 11/2020 | Kamata | |

FOREIGN PATENT DOCUMENTS

| | | |
|---|---|---|
| JP | 2016-203882 A | 12/2016 |
| JP | 2019-171970 A | 10/2019 |
| JP | 2020-179749 A | 11/2020 |

*Primary Examiner* — Mathew Franklin Gordon
(74) *Attorney, Agent, or Firm* — Dinsmore & Shohl LLP

(57) ABSTRACT

Processing to set a control mode of driving control is performed. In this setting processing, it is determined whether or not a predetermined condition in which a tracking performance of a vehicle state with respect to a target vehicle state decreases is satisfied. Then, when it is determined that the predetermined condition is satisfied, the control mode is switched from a normal mode to a temporary mode. In the temporary mode, generation of a driving plan is stopped. Alternatively, updating or referring to the driving plan generated while it is determined that the predetermined condition is satisfied is prohibited. Alternatively, an instruction value for control calculated using a target control value and a current vehicle state in the driving plan generated while it is determined that the predetermined condition is satisfied is modified.

8 Claims, 8 Drawing Sheets

VEHICLE CONTROL SYSTEM AND VEHICLE CONTROL METHOD

CROSS-REFERENCE TO RELATED APPLICATION

The present application claims priority under 35 U.S.C. § 119 to Japanese Patent Application No. 2021-180337, filed on Nov. 4, 2021, the contents of which application are incorporated herein by reference in their entirety.

TECHNICAL FIELD

The present disclosure relates to systems and methods for vehicle driving control.

BACKGROUND

JP2016-203882A discloses a system for controlling a vehicle. This conventional system generates a driving plan according to the target trajectory of the vehicle. The conventional system also generates a control width of the target control value of the vehicle in the driving plan. The control width indicates a width of the target control value that can be allowed in light of the driving plan even if the vehicle state deviates from the target vehicle state. The conventional system further calculates a command control value to be a target vehicle state corresponding to the target control value, and controls an actuator of the vehicle based on the command control value.

In the driving control of the vehicle according to the conventional system, it is determined whether or not the current vehicle state greatly deviates from the driving plan using the control width of the target control value. When it is determined that the vehicle state greatly deviates from the driving plan, the parameter of the actuator is changed so that the output of the actuator quickly approaches the output corresponding to the command control value. Otherwise, the parameter is changed so that the output of the actuator gradually approaches the output corresponding to the command control value. Therefore, it is possible to bring the vehicle state close to the target vehicle state in accordance with the degree of deviation of the current vehicle state from the driving plan.

SUMMARY

The target control value in the driving plan includes information on a target position in a coordinate system fixed to the vehicle. In the driving control based on the target position, a deviation (a self-localization deviation) between each target position and the current estimated position of the vehicle is calculated. Then, an instruction value for control of the actuator is calculated so as to reduce the position deviation.

Here, a case where the self-localization deviation in the longitudinal direction of the vehicle during traveling is several tens of centimeters is considered. When the vehicle is cruising at a medium or high speed, it can be said that this degree of self-localization deviation is within an allowable range. On the other hand, when the vehicle travels at a very low speed with emphasis on the target position, the tracking performance of the vehicle state (that is, the vehicle location) with respect to the comfortable ride for passenger or the target position is greatly affected.

It is expected that the influence of the self-localization deviation of about several tens of centimeters on the comfortable ride for passenger and the tracking performance becomes remarkable particularly in a speed range just before stopping. The decrease in the tracking performance immediately before the vehicle stops makes it difficult to stop at the target position or stop at the target position at a target time. This problem cannot be solved by changing the parameters based on the conventional deviation determination. When the parameter is changed based on the deviation determination, there is a possibility that the comfortable ride for passenger of the vehicle is adversely affected.

An object of the present disclosure is to provide a technique capable of suppressing a decrease in tracking performance of a vehicle state with respect to a driving plan generated based on a target trajectory of a vehicle.

A first aspect is a system for performing driving control of a vehicle, and has the following features.

The vehicle control system includes a controller. The controller includes a processor and a memory. A program executable by the processor is stored in the memory.

When the program for the driving control is executed by the processor, the processor is configured to:
  generate a driving plan of the vehicle according to a target trajectory indicating a trajectory on which the vehicle is to travel;
  calculate, based on a current vehicle state of the vehicle and a target control value of the vehicle in the driving plan, an instruction value for control of a traveling actuator of the vehicle such that the vehicle state of the vehicle becomes a target vehicle state corresponding to the target control value; and
  execute control of the traveling actuator based on the instruction value for control.

When the program for the driving control is executed by the processor, the processor is configured to execute processing to set a control mode of the driving control.

In the processing to set the control mode, the processor is configured to:
  determine whether a predetermined condition in which tracking performance of a vehicle state with respect to the target vehicle state is reduced is satisfied; and
  when it is determined that the predetermined condition is satisfied, switch the control mode from a normal mode to a temporary mode.

In the normal mode, the instruction value for control is calculated using the current vehicle state and the target control value in the driving plan.

In the temporary mode, generation of the driving plan is stopped, update or reference of the driving plan generated while it is determined that the predetermined condition is satisfied is prohibited, or correction of the instruction value for control calculated using the target control value and the current vehicle state in the driving plan generated while it is determined that the predetermined condition is satisfied is performed.

A second aspect further includes the following features in the first aspect.

When the control mode is set to the temporary mode and the generation of the driving plan is stopped, the processor is configured to control the traveling actuator based on the instruction value for control calculated using the target control value in the driving plan immediately before it is determined that the predetermined condition is satisfied.

A third aspect further has the following features in the first aspect.

When the control mode is set to the temporary mode and the update or reference of the driving plan generated while it is determined that the predetermined condition is satisfied is prohibited, the processor is configured to control the traveling actuator based on the instruction value for control calculated using the target control value in the driving plan immediately before it is determined that the predetermined condition is satisfied.

A fourth aspect further has the following features in the first aspect.

When the control mode is set to the temporary mode and the generation of the driving plan is stopped, the processor is configured to set a temporal target control value according to a content of the driving control executed immediately before it is determined that the predetermined condition is satisfied, and to control the traveling actuator based on the instruction value for control calculated using the temporal target control value.

A fifth aspect further has the following features in the first aspect.

When the instruction value for control calculated using the target control value and the current vehicle state in the driving plan generated while the control mode is set to the temporary mode and it is determined that the predetermined condition is satisfied is modified, the processor is configured to multiply the instruction value for control calculated based on the target control value and the current vehicle state in the driving plan by a predetermined parameter.

A sixth aspect further has the following feature in the first aspect.

In the processing to set the control mode, the processor is further configured to:
determine whether or not a limiting condition for limiting switching to the temporary mode is satisfied when it is determined that the predetermined condition is satisfied; and
when it is determined that the limiting condition is satisfied, stop the switching from the normal mode to the temporary mode.

A seventh aspect is a method for performing driving control of a vehicle, and has the following features.

The method comprising the steps of:
generating a driving plan for the vehicle according to a target trajectory indicating a trajectory on which the vehicle should travel;
calculating an instruction value for control of a traveling actuator of the vehicle based on the current vehicle state of the vehicle and a target control value of the vehicle in the driving plan, such that the vehicle state of the vehicle becomes a target vehicle state corresponding to the target control value;
controlling the traveling actuator based on the instruction value for control; and
setting a control mode of the driving control.
The step of setting the control mode includes the steps of:
determining whether a predetermined condition in which tracking performance of a vehicle state with respect to the target vehicle state is reduced is satisfied; and
switching the control mode from a normal mode to a temporary mode when it is determined that the predetermined condition is satisfied.

In the normal mode, the instruction value for control is calculated using the current vehicle state and the target control value in the driving plan.

In the temporary mode, generation of the driving plan is stopped, update or reference of the driving plan generated while it is determined that the predetermined condition is satisfied is prohibited, or correction of the instruction value for control calculated using the target control value and the current vehicle state in the driving plan generated while it is determined that the predetermined condition is satisfied is performed.

An eighth aspect further has the following features according to the seventh aspect.

The step of setting the control mode further includes the steps of:
determining whether or not a limiting condition for limiting switching to the temporary mode is satisfied when it is determined that the predetermined condition is satisfied; and
stopping switching from the normal mode to the temporary mode when it is determined that the limiting condition is satisfied.

According to the first or seventh aspect, the control mode is switched from the normal mode to the temporary mode when a predetermined condition in which the tracking performance of the vehicle state with respect to the target vehicle state decreases is satisfied. In the temporary mode, generation of the driving plan is stopped. Alternatively, updating or referring to the driving plan generated while it is determined that the predetermined condition is satisfied is prohibited. Alternatively, the instruction value for control calculated using the target control value and the current vehicle state in the driving plan generated while it is determined that the predetermined condition is satisfied may be modified.

By stopping the generation of the driving plan, the calculation of the instruction value for control based on the target control value, which may degrade the tracking performance, is avoided. Even when updating or referring to the driving plan generated while it is determined that the predetermined condition is satisfied is prohibited, calculation of the instruction value for control based on the target control value, which may degrade tracking performance, is avoided. When the instruction value for control calculated using the target control value and the current vehicle state in the driving plan generated while it is determined that the predetermined condition is satisfied is corrected, it is possible to suppress a decrease in tracking performance compared to a case where the correction is not performed.

According to the second aspect, when the control mode is set to the temporary mode and the generation of the driving plan is stopped, the traveling actuator is controlled based on the instruction value for control calculated by using the target control value in the driving plan immediately before it is determined that the predetermined condition is satisfied. The target control value in the driving plan immediately before it is determined that the predetermined condition is satisfied may be referred to as a target control value having a low possibility of reducing the tracking performance. Therefore, according to the second aspect, it is possible to continue the execution of the driving control based on the target control value having a low possibility of reducing the tracking performance.

According to the third aspect, when the control mode is set to the temporary mode and updating or referring to the driving plan generated while it is determined that the predetermined condition is satisfied is prohibited, the traveling actuator is controlled based on the instruction value for control calculated using the target control value in the driving plan immediately before it is determined that the predetermined condition is satisfied. Therefore, it is possible to obtain the same effect as the second aspect.

According to the fourth aspect, when the control mode is set to the temporary mode and the generation of the driving plan is stopped, the temporal target control value corresponding to the content of the driving control executed immediately before it is determined that the predetermined condition is satisfied is set, and the traveling actuator is controlled based on the instruction value for control calculated using the temporal target control value. If the temporal target control value is used, it is not necessary to use the target control value that may degrade tracking performance. Therefore, according to the fourth aspect, it is possible to suppress a decrease in tracking performance as compared with a case where a target control value that may decrease tracking performance is used.

According to the fifth aspect, when the instruction value for control calculated using the target control value and the current vehicle state in the driving plan generated while the control mode is set to the temporary mode and it is determined that the predetermined condition is satisfied is corrected, the instruction value for control calculated based on the target control value and the current vehicle state in the driving plan is multiplied by the predetermined parameter. By multiplying the instruction value for control by the predetermined parameter, the target control value that may reduce the tracking performance is corrected. Therefore, according to the fifth aspect, it is possible to obtain the same effect as that of the fourth aspect.

According to the sixth or eighth aspect, when it is determined that the limiting condition for limiting the switching to the temporary mode is satisfied, the switching from the normal mode to the temporary mode is stopped. Therefore, it is possible to avoid switching to the temporary mode in a situation where switching to the temporary mode is not appropriate.

DESCRIPTION OF EMBODIMENT

Figure 1:
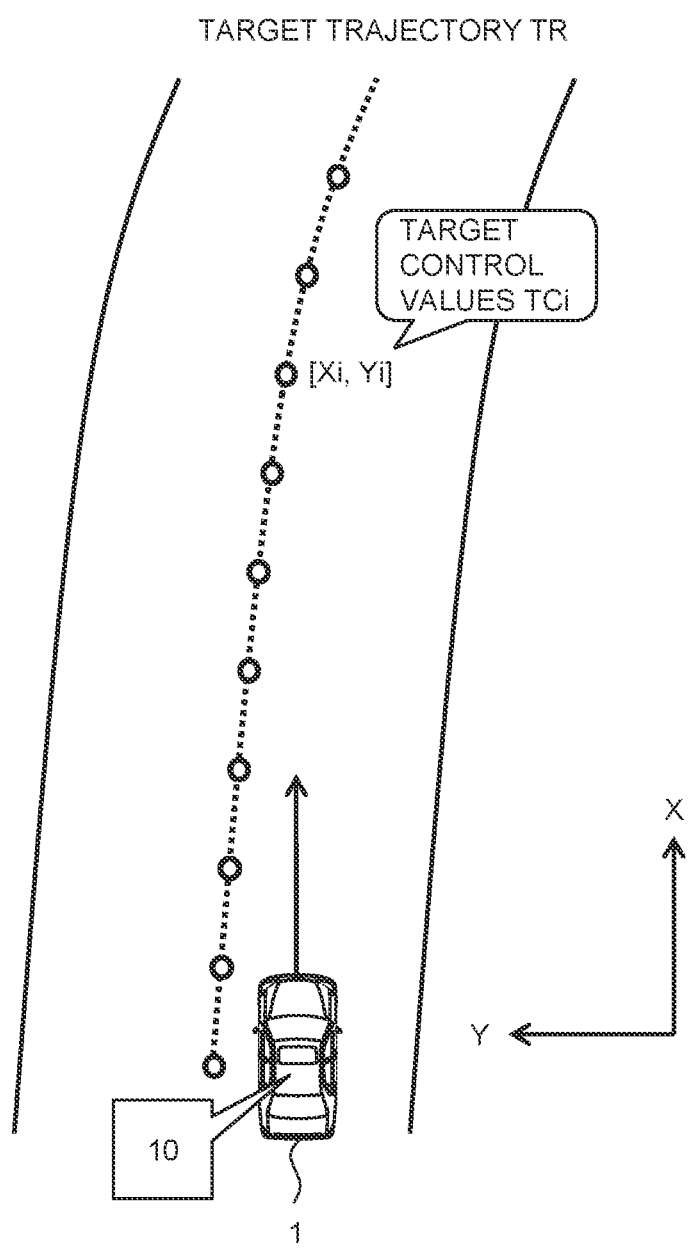
FIG. 1 is a diagram for explaining an outline of driving control based on a driving plan performed by a vehicle control system according to an embodiment.

Hereinafter, a vehicle control system and a vehicle control method according to an embodiment of the present disclosure will be described with reference to the drawings. The vehicle control method according to the embodiment is implemented by computer processing performed in a vehicle control system. In the drawings, the same or corresponding portions are denoted by the same reference numerals, and the description thereof is simplified or omitted.

1. Outline of Embodiment
1-1. Driving Control Based on Driving Plan

FIG. 1 is a diagram for explaining an outline of driving control based on a driving plan performed by a vehicle control system according to an embodiment. A vehicle control system (hereinafter, also simply referred to as a "system") 10 illustrated in FIG. 1 controls a vehicle 1. Typically, the system 10 is mounted on a vehicle 1. At least a part of the system 10 may be disposed in an external device outside the vehicle 1, or the vehicle 1 may be remotely controlled. That is, the system 10 may be distributed between the vehicle 1 and an external device.

The vehicle 1 controlled by the system 10 is a vehicle capable of autonomous driving. Autonomous driving here is assumed to be based on the premise that a driver of the vehicle 1 (or a remote operator) does not necessarily concentrates on 100% driving.

The system 10 performs driving control of the vehicle 1. In the driving control of the vehicle 1, steering, acceleration, and deceleration of the vehicle 1 are controlled. When the autonomous driving of the vehicle 1 is performed, the system 10 performs the driving control such that the vehicle 1 follows the target trajectory TR. The target trajectory TR is a trajectory on which the vehicle 1 should travel. The target trajectory TR is generated based on, for example, a traveling route from the departure place to the destination of the vehicle 1. The traveling route is calculated by, for example, a navigation system (not illustrated). The target trajectory TR may be generated based on the surrounding information of the vehicle 1 or may be generated based on a combination of the traveling route and the surrounding information.

The driving plan corresponding to the target trajectory TR is generated on the target trajectory TR. The driving plan is generated based on the surrounding information of the vehicle 1 and the map information, for example. The driving plan may be generated based on only the surrounding information of the vehicle 1 without using the map information. The driving plan includes a set of target control values TCi in the driving control of the vehicle 1. As the target control value TCi, a target position [Xi, Yi] through which the vehicle 1 should pass is exemplified. In the example shown in FIG. 1, an X direction is a forward direction of the vehicle 1, and a Y direction is a planar direction orthogonal to the X direction. However, the coordinate system (X, Y) is not limited to the example shown in FIG. 1. The target position [Xi, Yi] is set at a predetermined service frequency (for example, 1 to 2 m) on the target trajectory TR. The target position [Xi, Yi] is generally set for several to several tens of seconds ahead of the current time.

The target control value TCi may be a combination of the target position [Xi, Yi] and the target speed [VXi, VYi] of the vehicle 1 at the target position [Xi, Yi]. Instead of target speed [VXi, VYi], a target time at target position [Xi, Yi] may be used. When the target time is used, the target control value TCi may further include the azimuth of the vehicle 1 at the target time. The target control value TCi may include at least one of a target yaw angle of the vehicle 1 at the target position [Xi, Yi] and a target acceleration of the vehicle 1 at the target position [Xi, Yi] the target position [Xi, Yi] and a target acceleration of the vehicle 1 at the target position [Xi, Yi].

In order to cause the vehicle 1 to follow the target trajectory TR, in the driving control, a deviation (for example, a position deviation, a speed deviation, a time deviation, a yaw angle deviation, or a speed deviation) between the target vehicle state corresponding to the target control value TCi and the current vehicle state of the vehicle 1 is calculated. In the driving control, an instruction value for control of a traveling actuator of the vehicle 1 is calculated so as to reduce the deviation. That is, the instruction value for control is a command value for controlling the current vehicle state to the target vehicle state. The traveling actuator includes a steering actuator, a drive actuator, and a braking actuator. Then, the traveling actuator is controlled based on the instruction value for control.

1-2. Problems in Driving Control Based on Driving Plan

Here, a case where the self-localization deviation in the longitudinal direction of the vehicle during traveling is several tens of centimeters is considered. When the vehicle is cruising at a medium or high speed, it can be said that this degree of self-localization deviation is within an allowable range. On the other hand, when the vehicle travels at a very low speed with emphasis on the target position, the tracking performance of the vehicle state (that is, the vehicle location) with respect to the target position is greatly affected. In particular, just before the vehicle stops, a self-localization deviation of about several tens of centimeters greatly affects the tracking performance.

Figure 2:
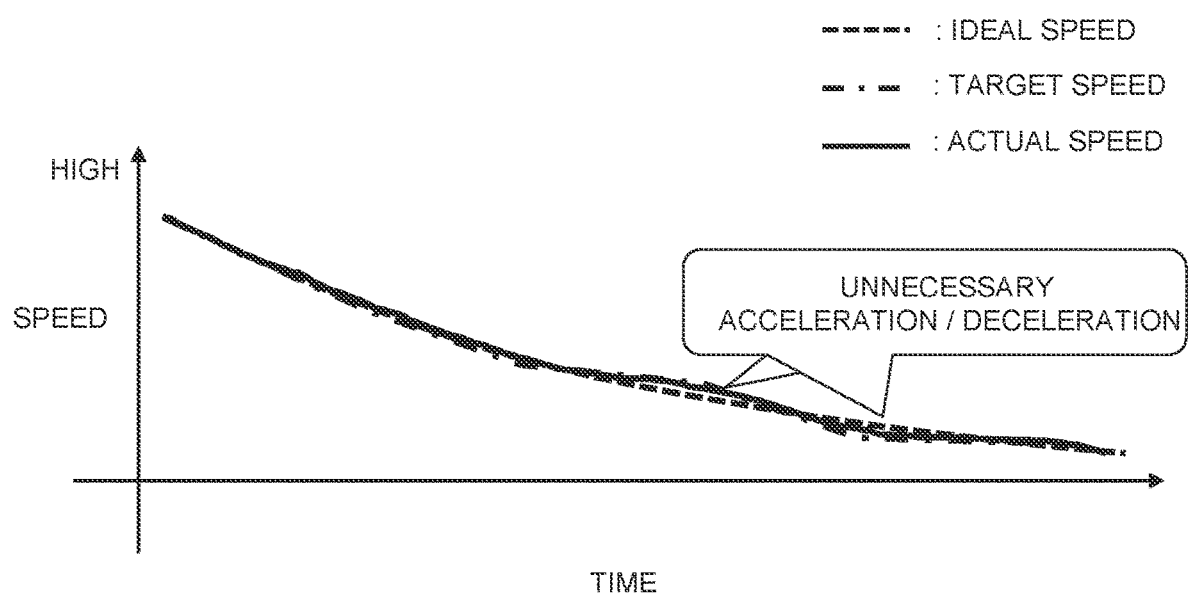
FIG. 2 is a diagram illustrating a problem of driving control based on a driving plan.

This problem will be described with reference to FIG. 2. FIG. 2 is a diagram showing a transition example of a vehicle speed during execution of driving control for deceleration. In FIG. 2, three different vehicle speed profiles are shown. A broken line indicates a transition of the vehicle speed (ideal vehicle speed) when ideal deceleration is performed. An alternate long and short dash line indicates a transition of the target vehicle speed calculated from the position deviation. A solid line indicates a transition of the actual vehicle speed when the traveling actuator is controlled according to the instruction value for control calculated based on the target speed.

Here, the target vehicle speed at each target position [Xi, Yi] up to the target stop position is calculated so that the target vehicle speed at the target stop position becomes 0 just before the vehicle stops. However, in a case where the self-location estimation result deviates in the direction of the target stop position, in order to realize the target control value, extra deceleration is required compared to before the position deviation occurs, and it is necessary to decrease the target vehicle speed. On the other hand, when the self-location estimation result deviates in a direction opposite to the direction of the target stop position, it is necessary to increase the target vehicle speed. As a result, unnecessary acceleration/deceleration is performed, and comfortable ride for passenger is impaired. As a result, tracking performance to the target control value is degraded.

The problem of degraded tracking performance explained in FIG. 2 is not limited to deceleration of the vehicle explained in FIG. 2, but can also occur while the vehicle is starting. However, this problem is more noticeable during deceleration than during starting, and is particularly noticeable during deceleration and stop. This is because the target position for stopping the vehicle is important for deceleration and stopping, but the tracking performance of the vehicle state for the target position is degraded, so the vehicle stops at this target stop position or stops at the target time. This is because it becomes difficult to stop at the target position.

The driving control based on the driving plan has another problem. Another problem is the changing characteristics of the traveling actuator during driving control. For example, power regeneration control during decelerating driving is performed by cooperative control of regenerative braking and hydraulic braking. However, in the very low speed range just before stopping, braking is performed only by hydraulic brakes by cooperative control. Therefore, the vehicle state (for example, vehicle location, vehicle speed, etc.) fluctuates greatly at the time of transition to this very low speed region.

Figure 3:
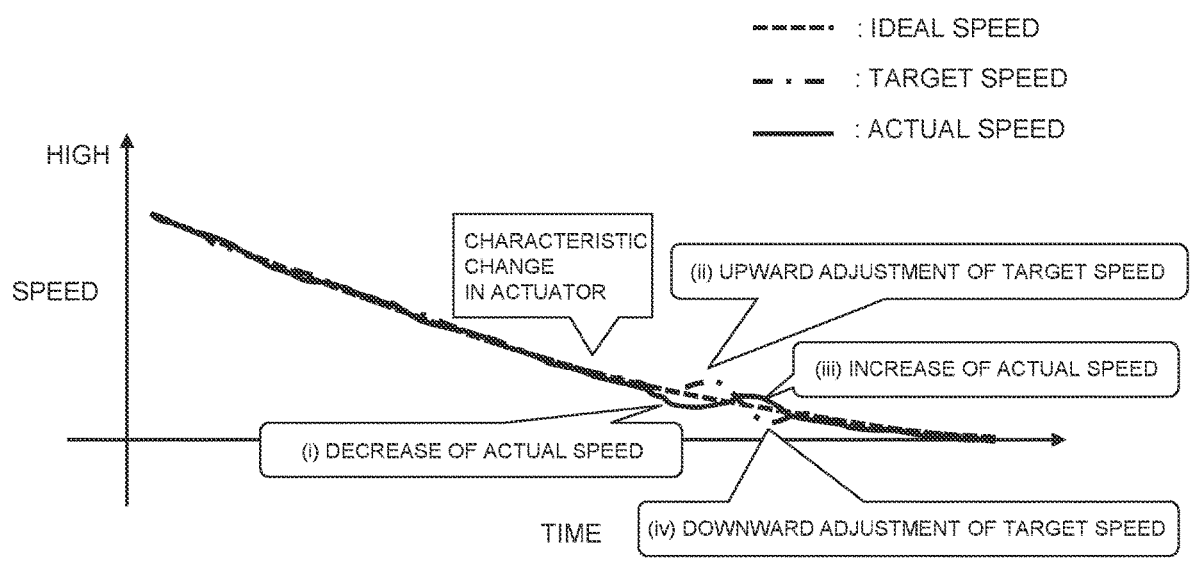
FIG. 3 is a diagram illustrating another problem of driving control based on the driving plan.

This problem will be explained with reference to FIG. 3. FIG. 3 shows an example of changes in vehicle speed during cooperative control of regenerative braking and hydraulic braking. The three vehicle speeds shown in FIG. 3 are the same as those shown in FIG. 2.

As can be seen from the transitions of the three types of vehicle speed shown in FIG. 3, the three types of vehicle speeds generally match before the characteristic change of the braking actuator due to cooperative control occurs. However, in the example shown in FIG. 3, the actual vehicle speed temporarily greatly decreases as the characteristics change (FIG. 3 (i)). Then, the target vehicle speed is revised upward to bring the vehicle state closer to the target vehicle state (that is, the target vehicle speed), and the actual vehicle speed increases as a result of this upward revision (FIG. 3 (ii) and (iii)). Then, the target vehicle speed is revised downward to bring the vehicle state closer to the target vehicle state (FIG. 3 (iv)). In this way, unnecessary acceleration/deceleration is performed after the characteristic change occurs.

1-3. Switching of Control Mode

Therefore, in the driving control according to the embodiment, "control mode setting processing" for switching the control mode of the driving control between "normal mode" and "temporary mode" is performed. The normal mode is a control mode for controlling the traveling actuator based on the deviation between the current vehicle state and the target vehicle state corresponding to the target control value TCi. The temporary mode is a control mode that is performed when it is predicted that the tracking performance of the vehicle state with respect to the target vehicle state will deteriorate if the traveling actuator is controlled by the normal mode.

The default mode for control mode is normal mode. The control mode switching in the control mode setting processing is performed based on whether or not a predetermined condition that the tracking performance of the vehicle state with respect to the target vehicle state corresponding to the target control value TCi is degraded is satisfied. Determination of the predetermined condition is performed based on peripheral information of vehicle 1, information on recognition accuracy of self-location, and information on the speed range in which the characteristic change of the traveling actuator occurs. When normal mode is set and it is determined that the predetermined condition is satisfied, control mode is switched to temporary mode. When the temporary mode is set and it is determined that the predetermined condition is not satisfied, the control mode is switched to the normal mode. In addition, another condition may be added to the predetermined condition to limit the switching of the control mode.

While temporary mode is set, the generation of the driving plan is stopped (first example). The stop of the generation of the driving plan avoids the calculation of the instruction values for control based on the target control values TCi, which can degrade the tracking performance. Therefore, the problem mentioned above is solved. Also, even if the generation of the driving plan is stopped, the calculation of the instruction value for control based on the target control value TCi constituting the driving plan immediately before it is determined that the predetermined condition is satisfied is performed. That is, in the first example, the instruction value for control calculated based on the driving plan generated just before it is determined that the predetermined condition is satisfied is input to the traveling actuator. Thus, according to the first example, execution of driving control is continued based on the target control value TCi that is less likely to degrade tracking performance.

In the second example, the generation of the driving plan is continued while the temporary mode is set. However, in the second example, updating the driving plan generated while temporary mode is set is prohibited. Referencing the driving plan generated while temporary mode is set may be prohibited. Prohibiting updating or referencing the driving plan has the same effect as the first example described above. In either case, as in the first example, the instruction value for control calculated based on the driving plan generated just before the predetermined condition was determined to be satisfied is input to the traveling actuator. Thus, according to the second example, even when the driving plan continues to be generated, the driving control continues to be executed based on the target control value TCi that is less likely to degrade the tracking performance.

In the third example, the generation of the driving plan is stopped. This point is the same as the first example. However, in the third example, the temporal target control value is set according to the contents of the driving control that was executed immediately before it was determined that the predetermined condition was satisfied. Examples of this driving control include deceleration stop control and start control. Deceleration stop control is a control to decelerate vehicle 1 and stop it at the target stop position. Start control is control for canceling the stopping state of vehicle 1 and starting.

A "distance to the target stop position" is exemplified as the temporal target control value when the deceleration stop control is being executed. Another example is the combination of "distance to target stop position" and "remaining time until vehicle speed decreases to zero". An example of the temporal target control value when the start control is being executed is "remaining time until the vehicle speed rises to a predetermined speed or higher". If a temporal target control value is set, the deviation (eg distance deviation to target stop position, remaining time deviation) between the corresponding target vehicle state and the current vehicle state of vehicle 1 is calculated. An instruction value for control of the traveling actuator is then calculated to reduce this deviation. Thus, in the third example, the temporal target control value is used instead of the target control value TCi, which may degrade the tracking performance, thereby solving the problems mentioned above.

In the fourth example, the generation of the driving plan is continued while the temporary mode is set. This point is the same as the second example. In the fourth example, the instruction value for control is also calculated based on the current vehicle state and the target vehicle state corresponding to the target control value that constitutes the driving plan generated while the temporary mode is set. be. However, in the fourth example, the calculated instruction value for control is multiplied by a predetermined parameter.

The speed range in which the characteristic change of the traveling actuator occurs is known, so the variation of the vehicle state when the characteristic change occurs is predictable to some extent. The predetermined parameter is a parameter for canceling such predicted variation of the vehicle state. As described above, in the fourth example, the target control value TCi, which may degrade the tracking performance, is corrected using a predetermined parameter, thereby solving the problem described above.

In summary, in the driving control according to the embodiment, setting processing of control mode is performed. And when the control mode is set to temporary mode by this setting processing, it avoids the calculation of the instruction value for control based on the target control value TCi, which can degrade the tracking performance, thereby reducing the tracking performance, is suppressed (first or second example). Alternatively, the temporal target control value is used instead of the target control value TCi, which can degrade tracking performance, thereby reducing the degradation of tracking performance (third example). Alternatively, the target control value TCi that may degrade the tracking performance is corrected, thereby suppressing the degradation of the tracking performance (fourth example).

The vehicle control system and vehicle control method according to the embodiment will be described in detail below.

2. Vehicle Control System 2-1. System Configuration Example

Figure 4:
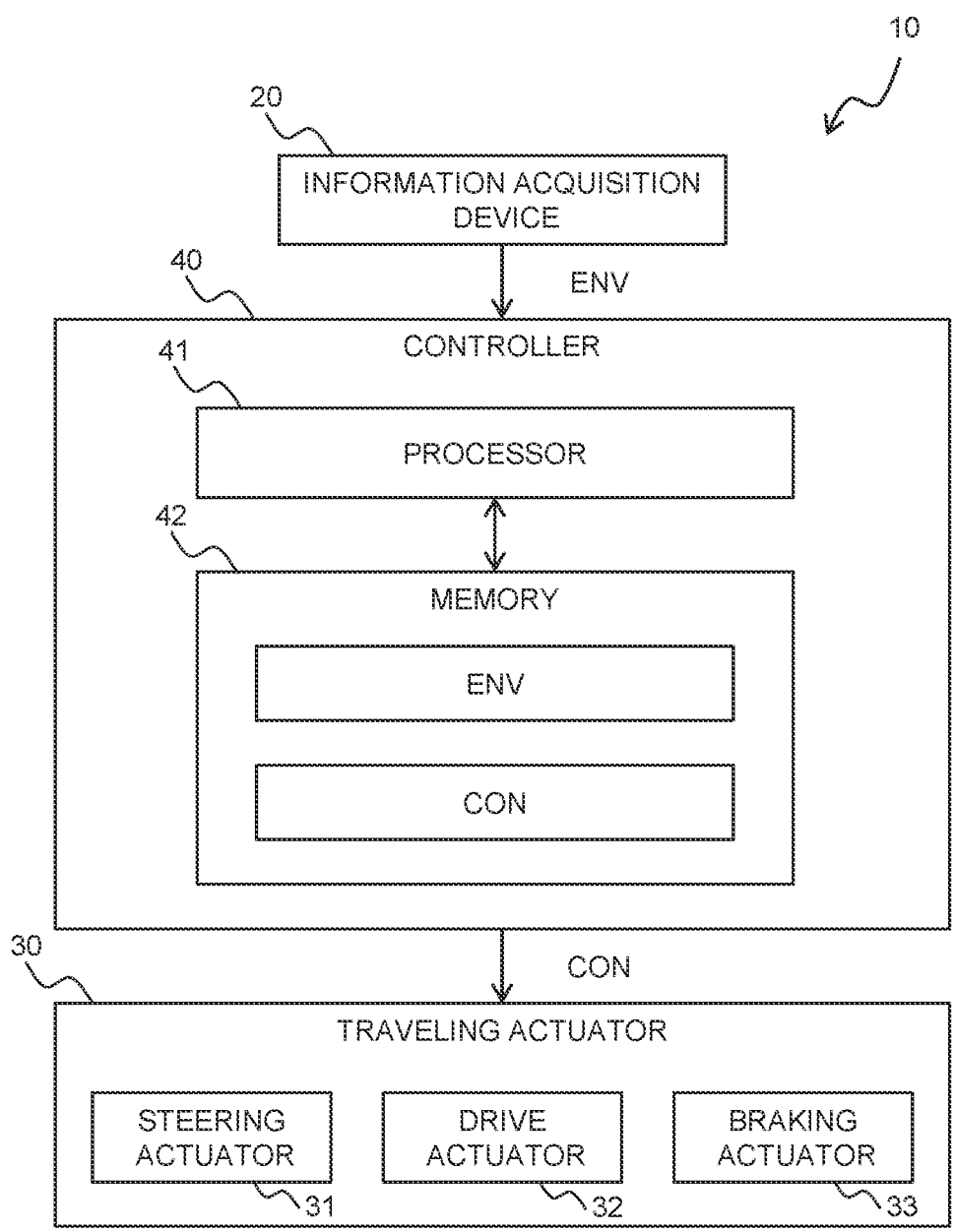
FIG. 4 is a block diagram illustrating a configuration example of a system according to the embodiment.

FIG. 4 is a block diagram showing an example configuration of the system according to the embodiment. In the example shown in FIG. 4, the system 10 comprises an information acquisition device 20, a traveling actuator 30 and a controller 40.

An information acquisition device 20 is a device for acquiring driving environment information ENV. The driving environment information ENV is information indicating the driving environment of the vehicle 1, and is information necessary for autonomous driving of the vehicle 1. Examples of the driving environment information ENV include map information, peripheral information, self-positional information, driving state information, and driver operation information.

The map information includes, for example, lane arrangement and road shape information. The map information is stored in a map database (not shown). A map database is an example of an information acquisition device 20. The map database may be formed in a memory device mounted on vehicle 1, or may be formed in a memory device possessed by an external management server (not shown).

The peripheral information is information indicating the situation around the vehicle 1. The peripheral information is acquired by, for example, a camera, radar, and LIDAR (Laser Imaging Detection and Ranging) mounted on vehicle 1. These in-vehicle sensors are examples of information acquisition device 20.

The self-positional information is information indicating the position and orientation of vehicle 1. The self-positional information is acquired by a GPS (Global Positioning System) device mounted on vehicle 1, for example. The GPS device is also an example of the information acquisition device 20. The self-positional information may be refined by well-known self-location estimate processing.

The driving state information is information indicating the driving state of vehicle 1. The driving state information is acquired by, for example, a vehicle speed sensor, yaw rate sensor, acceleration sensor and steering angle sensor. The vehicle speed sensor detects vehicle speed. The yaw rate sensor detects the yaw rate of vehicle 1. The acceleration sensor detects the acceleration of vehicle 1 (e.g., lateral acceleration, longitudinal acceleration, etc.). The steering angle sensor detects the steering angle of vehicle 1. These in-vehicle sensors are also examples of the information acquisition device 20.

The driver operation information is information indicating an operation to the vehicle 1 by the vehicle 1 node driver (or remote operator). The driver operation information is acquired by, for example, the vehicle 1 steering sensor, accelerator pedal sensor, and brake pedal sensor. The steering sensor detects, for example, the steering torque applied to the steering wheels by the driver. The accelerator pedal sensor detects the amount of depression of the accelerator pedal by the driver. The brake pedal sensor detects the operation amount of the brake pedal by the driver. These in-vehicle sensors are also examples of the information acquisition device 20.

The traveling actuator 30 includes a steering actuator 31, a drive actuator 32 and a braking actuator 33. The steering actuator 31 steers the tires of vehicle 1. An EPS (Electric Power Steering) actuator is exemplified as the steering actuator 31. The drive actuator 32 generates a driving force. The drive actuator 32 is exemplified by an engine throttle valve, a motor, and the like. The braking actuator 33 generates a braking force. A motor, a hydraulic brake, and the like are exemplified as the braking actuator 33.

The controller 40 is an information processing device that performs various processes. The controller 40 is also called an ECU (Electronic Control Unit). The controller 40 is, for example, a microcomputer having processor 41 and a memory 42. The processor 41 includes a CPU (Central Processing Unit). The memory 42 is a volatile memory such as DDR memory, which develops various programs used by the processor 41 and temporarily stores various information. Various information stored in the memory 42 includes driving environment information ENV. The various information stored in the memory 42 also includes instruction values for control CON sent to the traveling actuator 30.

The processor 41 executes software for vehicle control, which is a computer program. Software for vehicle control is stored in the memory 42 or recorded in a computer-readable recording medium. Various functions of the controller 40 are realized by the processor 41 executing software for vehicle control.

2-3. Function Configuration Example for Controller

Figure 5:
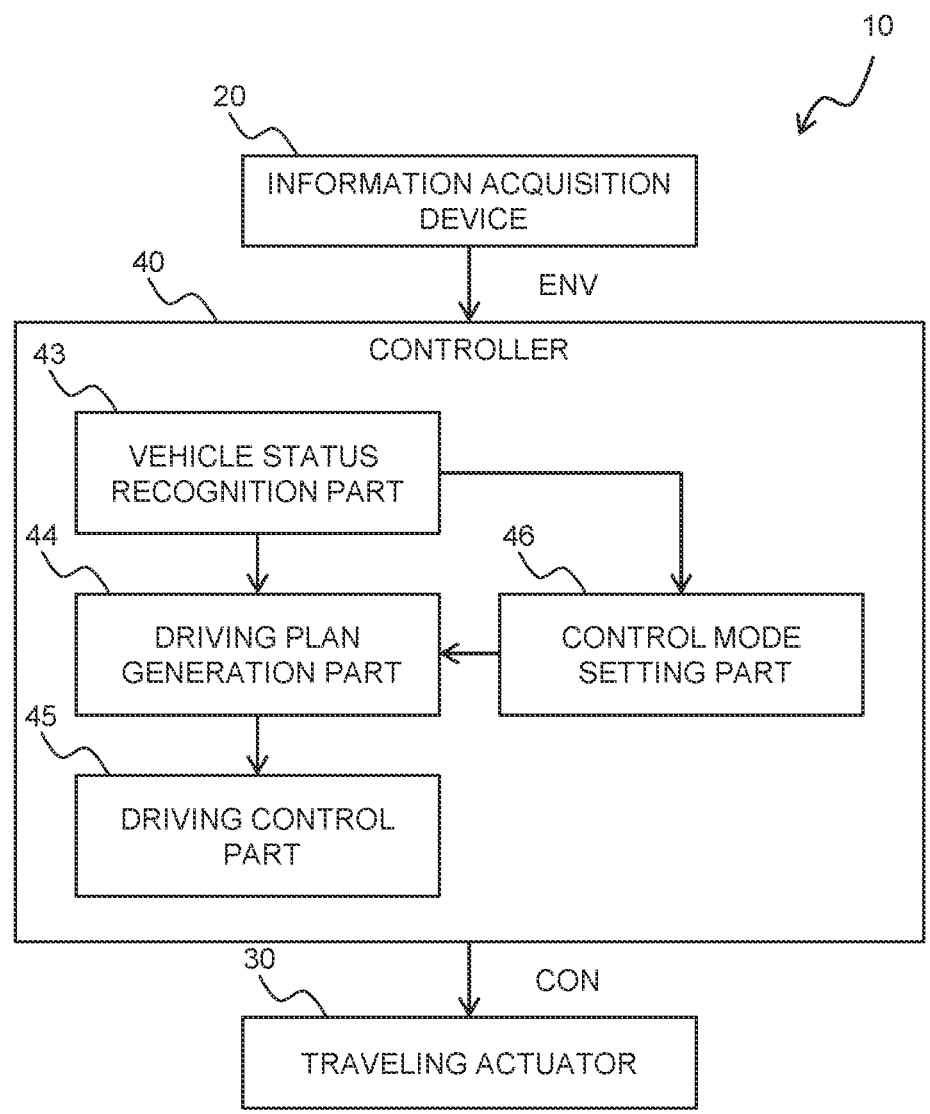
FIG. 5 is a block diagram illustrating a function configuration example of the controller illustrated in FIG. 4.

FIG. 5 is a block diagram showing a function configuration example of controller 40 shown in FIG. In the example shown in FIG. 5, the controller 40 comprises a vehicle status recognition part 43, a driving plan generation part 44, a driving control part 45 and a control mode setting part 46.

The vehicle status recognition part 43 recognizes the vehicle state of vehicle 1. The vehicle state recognized by the vehicle status recognition part 43 includes positional information of vehicle 1 on the map. Positional information of vehicle 1 on the map is recognized based on map information and self-positional information, for example. The vehicle state recognized by the vehicle status recognition part 43 also includes object information around the vehicle 1. Object information is recognized based on surrounding information. Examples of objects include vehicles other than vehicle 1, walkers, roadside objects, obstacles, and white lanes (compartment lines). The object information includes information on the relative position and relative speed of the object with respect to vehicle 1.

The vehicle state recognized by the vehicle status recognition part 43 further includes vehicle 1 characteristic information. The characteristic information is, for example, the reliability (sensor reliability) of detection results by a peripheral information sensor such as a camera or a vehicle state sensor such as a vehicle speed sensor. For example, sensor reliability is recognized based on the results of comparing the detection results of two sensors capable of detecting the same object. When the detection results are equal, the reliability is recognized as high, and when the detection results diverge, the reliability is recognized as low. Specifically, if the object recognition results based on camera shooting information and radar obstacle information match, reliability is recognized as high, and if these recognition results do not match, reliability is recognized as low. be done.

The driving plan generation part 44 generates a target trajectory TR for vehicle 1. The target trajectory TR is generated, for example, based on a traveling route calculated by a navigation system. The target trajectory TR may be generated based on the peripheral information of the vehicle 1, or may be generated based on a combination of the traveling route and the peripheral information. The target trajectory TR is generated so that the vehicle 1 can travel favorably in light of standards such as safety, legal patrol, and driving efficiency.

The driving plan generation part 44 also generates a driving plan according to the generated target trajectory TR. The driving plan is generated, for example, based on vehicle 1's surrounding information and map information. The driving plan may be generated based only on the surrounding information of vehicle 1 without using the map information. The driving plan contains a set of target control values TCi in the vehicle 1 driving control. Target control value TCi is a combination of target position [Xi, Yi] through which vehicle 1 should pass, target position [Xi, Yi], and target speed [VXi, VYi] of vehicle 1 at target position [Xi, Yi], etc. are exemplified.

When the target trajectory TR is generated, the driving plan generation part 44 overwrites the past target trajectory TR with the generated target trajectory TR. That is, when the target trajectory TR is generated, the driving plan generation part 44 updates the target trajectory TR. The driving plan generation part 44 generates a driving plan according to the updated target trajectory TR. Thus, when the target trajectory TR is updated, a driving plan is generated according to the updated target trajectory TR.

The driving plan generation part 44 also calculates instruction values for control of the traveling actuators 30 based on the driving plan. For example, the driving plan generation part 44 calculates the deviation between the target vehicle state corresponding to the target control value TCi contained in the driving plan and the current vehicle state of vehicle 1. The driving plan generation part 44 then calculates an instruction value for control CON to reduce this deviation. An instruction value for control CON is sent to the traveling actuator 30.

Figure 6:
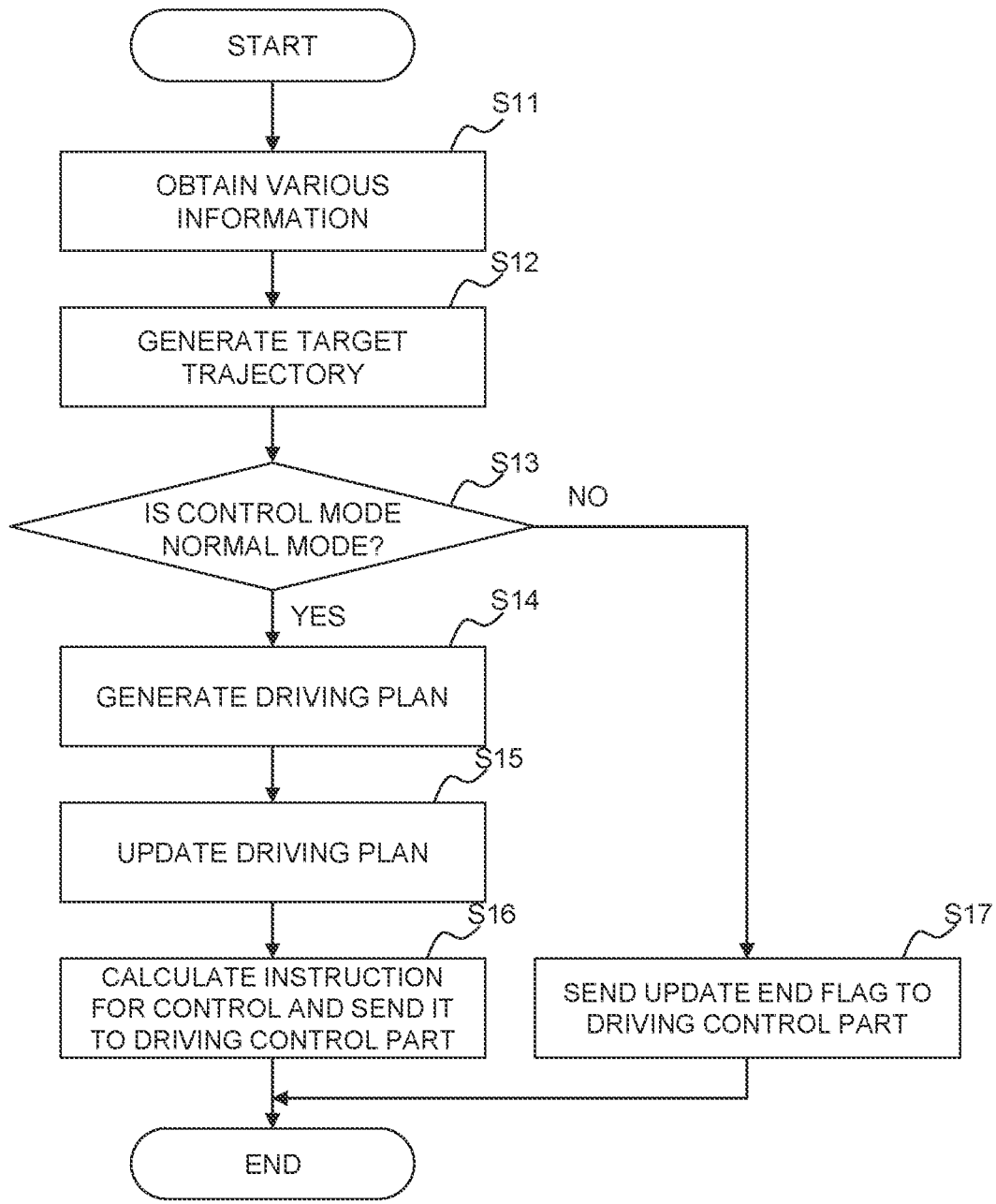
FIG. 6 is a flowchart showing an example of the flow of processing performed by the driving plan generation portion shown in FIG. 4.

FIG. 6 is a flow chart showing an example of the flow of processing performed by the driving plan generation part 44. The routine shown in FIG. 6 is repeatedly executed in a given cycle.

In the routine shown in FIG. 6, first, various information is obtained (step S11). Examples of the various information acquired in step S11 include traveling route information for generating the target trajectory TR, driving environment information ENV, and the like. The various information also includes information related to the vehicle state recognized by the vehicle status recognition part 43 (e.g., positional information of vehicle 1, object information around vehicle 1, and characteristic information of vehicle 1).

Following the processing of step S11, a target trajectory TR is generated (step S12). Subsequently, it is determined whether or not the control mode is set to the normal mode (step S13). In the process of step S13, if it is determined that the control mode is set to the normal mode, the driving plan is generated (step S14) and updated according to this driving plan (step S15). Then, an instruction value for control CON is calculated based on the updated driving plan and sent to the driving control part 45 (step S16). A specific example of the series of processes of steps S12 to S16 has already been described.

If the judgment result in step S13 is negative, an update end flag is sent to the driving control part 45 (step S17). That the judgment result in step S13 is negative means that the control mode is set to temporary mode. In other words, the processes of steps S13 and S17 are processes for realizing the "first example" in which the generation of the driving plan is stopped. The transmission of the update end flag is performed for the purpose of providing the driving control part 45 with information that the generation of the driving plan has been intentionally stopped.

In addition, in "third example", generation of the driving plan is stopped as in "first example". When realizing the "third example", the processing of step S17 is read as follows. In this case, a temporal target control value corresponding to the contents of the driving control currently being executed is generated and sent to the driving control part 45. For example, if the driving control currently being executed is a deceleration stop control, "distance to target stop position" and "remaining time until vehicle speed decreases to zero" are generated as temporal target control values. For example, when the content of the driving control currently being executed is start control, "remaining time until the vehicle speed increases and reaches or exceeds a predetermined speed" is generated as the temporal target control value. The temporal target control value may be sent to the driving control part 45 along with an update end flag.

Figure 7:
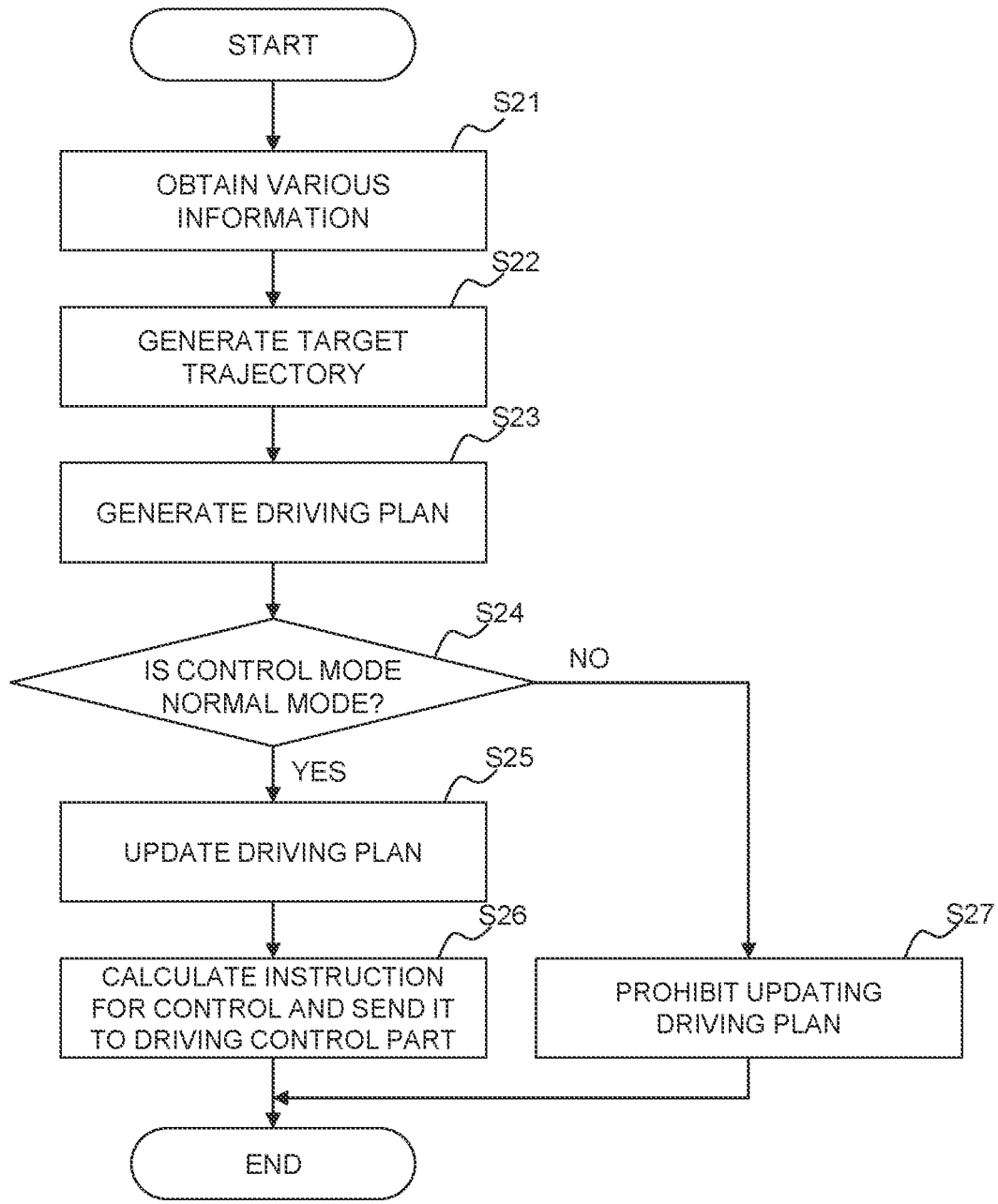
FIG. 7 is a flowchart showing another example of the flow of processing performed by the driving plan generation portion.

FIG. 7 is a flow chart showing another example of the processing flow performed by the driving plan generation part 44. The routine shown in FIG. 7, like the routine shown in FIG. 6, is repeatedly executed in a given cycle.

In the routine shown in FIG. 7, steps S21 to S23 are executed. The content of step S21 is the same as that of step S11 in FIG. 6, the content of step S22 is the same as that of step S12 of FIG. 6, and the content of step S23 is the same as that of step S14 of FIG. 6.

Following the process of step S23, it is determined whether or not the control mode is set to normal mode (step S24). If it is determined in the process of step S24 that the control mode is set to the normal mode, the driving plan generated in step S23 is used to update the driving plan (step S25). The content of the processing in step S24 is the same as that of step S13 in FIG. 6, and the content of the processing in step S25 is the same as that of step S15 in FIG. Following the process of step S25, the process of step S26 is executed. The content of step S26 is the same as that of step S16 in FIG. 6.

If the judgment result in step S24 is negative, updating the driving plan using the driving plan generated in step S23 is prohibited (step S27). In the processing of step S27, reference to the driving plan may be prohibited. That is, the processes of steps S24 and S27 are processes for realizing the "second example." By prohibiting updating or referencing the driving plan, the instruction value for control CON is not calculated based on the driving plan generated in step S23. In this case, the driving plan generated in step S23 may be immediately discarded or temporarily stored in the memory 42.

Note that, in the "fourth example", the driving plan is generated in the same way as in the "second example". When realizing the "fourth example", the process of step S27 is read as follows. In this case, the instruction value for control is calculated based on the current vehicle state and the target vehicle state corresponding to the target control value forming the driving plan generated in step S23. Then, the calculated instruction value for control is multiplied by a predetermined parameter. The predetermined parameter is set in advance as, for example, a parameter that offsets the variation of the vehicle state when the characteristic change of the traveling actuator occurs.

Returning to FIG. 5, the explanation of the function configuration example of the controller 40 is continued. The driving control part 45 performs driving control of vehicle 1. In driving control, the driving control part 45 controls the movement of the traveling actuator 30 using the instruction value for control CON. Specifically, the driving control part 45 controls the operation of the steering actuator 31 using the steering command value, thereby controlling the steering of the vehicle 1. Driving control part 45 also controls the acceleration of vehicle 1 by controlling the operation of drive actuator 32 using the drive command value. The driving control part 45 also controls the deceleration of the vehicle 1 by controlling the operation of the braking actuator 33 with the braking command value.

Figure 8:
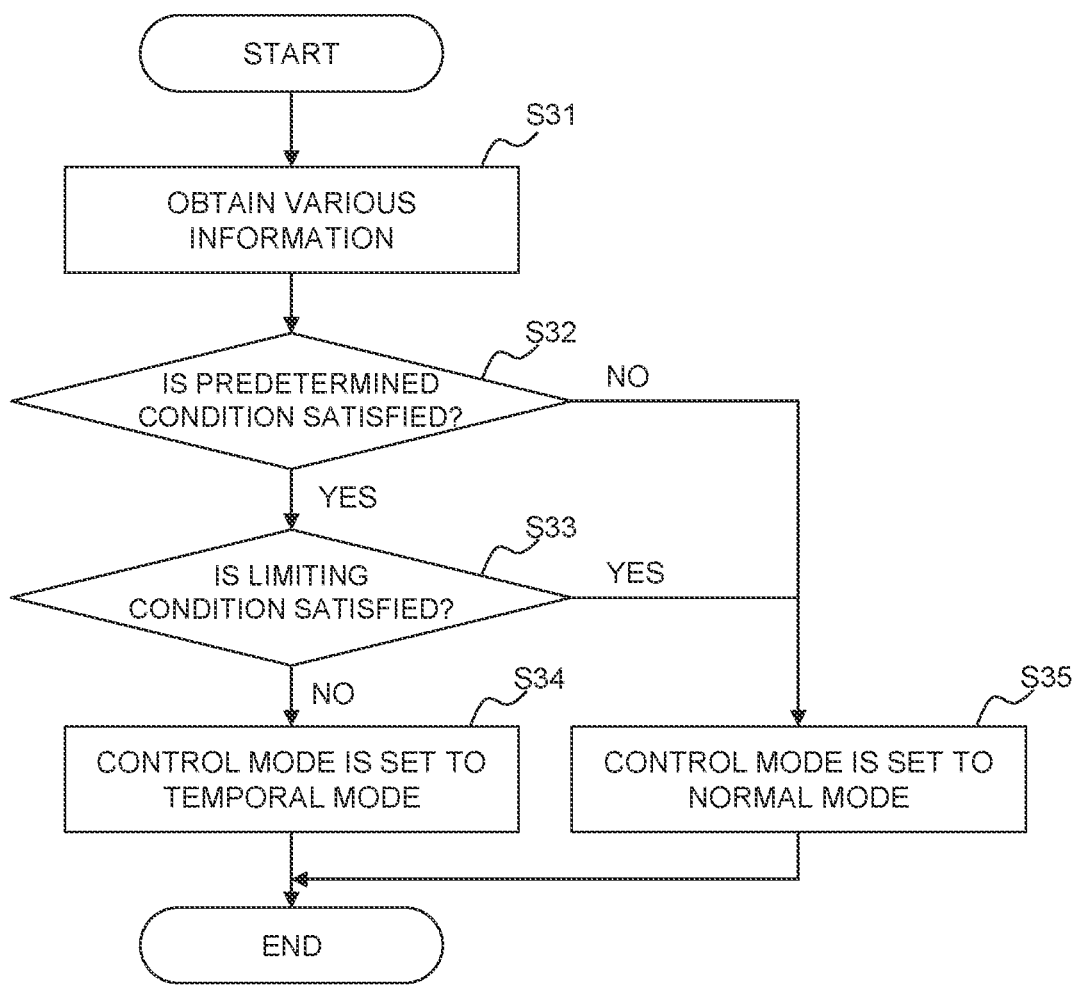
FIG. 8 is a flowchart illustrating an example of a flow of setting processing in a control mode.

A control mode setting part 46 performs control mode setting processing. The control mode setting part 46 transmits information on the control mode currently being set to the driving plan generation part 44. The control mode setting part 46 may send information on the currently set control mode to the driving control part 45. FIG. 8 is a flow chart showing an example of the flow of setting processing in control mode. The routine shown in FIG. 8 is repeatedly executed in a given cycle.

In the routine shown in FIG. 8, first, various information is obtained (step S31). Examples of the various information acquired in step S31 include driving state information, characteristic information, and driver operation information. As already explained, the driving state information is information acquired by an in-vehicle sensor such as a vehicle speed sensor, and is included in the driving environment information ENV. Property information is recognized by the vehicle status recognition part 43. The driver operation information is information acquired by a node driver operation detection sensor such as an accelerator pedal sensor, and is included in the driving environment information ENV.

Following the processing of step S31, it is determined whether or not the predetermined condition is satisfied (step S32). As already explained, the predetermined condition is used to switch the control mode between normal mode and temporary mode. Determination of the predetermined condition is performed, for example, based on the characteristic information acquired in the process of step S31. In this example, it is determined whether or not it is recognized that the sensor reliability is degraded based on the characteristic information. Then, when it is recognized that the sensor reliability is degraded, it is determined that the predetermined condition is satisfied.

In another example of determining the predetermined condition, the driving state information (vehicle speed information) acquired in the process of step S31 is used. In this example, when vehicle 1 is decelerating driving, it is determined based on the vehicle speed information whether the vehicle speed has decreased to the speed range where the characteristics of the traveling actuator 30 change. Then, when it is determined that the vehicle speed has decreased to the speed range where the characteristic change occurs, it is determined that the predetermined condition is satisfied.

If the judgment result in step S32 is positive, it is determined whether or not the limiting condition is satisfied (step S33). A limiting condition is a condition for limiting switching to temporary mode. Determination of the limiting condition is performed, for example, based on the driver operation information acquired in the process of step S31. During autonomous driving of vehicle 1, a vehicle 1 node driver (or a remote operator) may intervene in autonomous driving. In this case, the driver's intention is predicted based on the driver operation information. Switching to temporary mode may not be appropriate if the predicted intent does not match the contents of the driving control currently being executed. The processing of step S33 is processing for coping with such an exceptional situation.

If the judgment result in step S33 is negative, the control mode is switched and the control mode is set to temporary mode (step S34). On the other hand, if the judgment result is positive, control mode switching is restricted and the control mode is maintained in normal mode (step S35). The processing of step S35 is also performed when the judgment result of step S32 is negative.

What is claimed is:

1. A system for performing driving control of a vehicle, comprising a controller, the controller including:
    a processor; and
    a memory in which a program executable by the processor is stored,
    wherein, when the program for the driving control is executed by the processor, the processor is configured to:
    generate a driving plan of the vehicle according to a target trajectory indicating a trajectory on which the vehicle is to travel;
    calculate, based on a current vehicle state of the vehicle and a target control value of the vehicle in the driving plan, an instruction value for control of a traveling actuator of the vehicle such that the vehicle state of the vehicle becomes a target vehicle state corresponding to the target control value; and
    execute control of the traveling actuator based on the instruction value for control,
    wherein, when the program for the driving control is executed by the processor, the processor is further configured to execute processing to set a control mode of the driving control,
        wherein, in the processing to set the control mode, the processor is configured to:
        determine whether a predetermined condition in which tracking performance of a vehicle state with respect to the target vehicle state is reduced is satisfied; and
        when it is determined that the predetermined condition is satisfied, switch the control mode from a normal mode to a temporary mode,
        wherein, in the normal mode, the instruction value for control is calculated using the current vehicle state and the target control value in the driving plan,
        wherein, in the temporary mode, generation of the driving plan is stopped, update or reference of the driving plan generated while it is determined that the predetermined condition is satisfied is prohibited, or correction of the instruction value for control calculated using the target control value and the current vehicle state in the driving plan generated while it is determined that the predetermined condition is satisfied is performed.

2. The system according to claim 1,
    wherein, when the control mode is set to the temporary mode and the generation of the driving plan is stopped, the processor is configured to control the traveling actuator based on the instruction value for control calculated using the target control value in the driving plan immediately before it is determined that the predetermined condition is satisfied.

3. The system according to claim 1,
    wherein, when the control mode is set to the temporary mode and the update or reference of the driving plan generated while it is determined that the predetermined condition is satisfied is prohibited, the processor is configured to control the traveling actuator based on the instruction value for control calculated using the target control value in the driving plan immediately before it is determined that the predetermined condition is satisfied.

4. The system according to claim 1,
    wherein, when the control mode is set to the temporary mode and the generation of the driving plan is stopped, the processor is configured to set a temporal target control value according to a content of the driving control executed immediately before it is determined that the predetermined condition is satisfied, and to control the traveling actuator based on the instruction value for control calculated using the temporal target control value.

5. The system according to claim 1,
    wherein, when the instruction value for control calculated using the target control value and the current vehicle state in the driving plan generated while the control mode is set to the temporary mode and it is determined that the predetermined condition is satisfied is modified, the processor is configured to multiply the instruction value for control calculated based on the target control value and the current vehicle state in the driving plan by a predetermined parameter.

6. The system according to claim 1,
    wherein, in the processing to set the control mode, the processor is further configured to:
    determine whether or not a limiting condition for limiting switching to the temporary mode is satisfied when it is determined that the predetermined condition is satisfied; and
    when it is determined that the limiting condition is satisfied, stop the switching from the normal mode to the temporary mode.

7. A method for performing driving control of a vehicle, comprising the steps of:
    generating a driving plan for the vehicle according to a target trajectory indicating a trajectory on which the vehicle should travel;
    calculating an instruction value for control of a traveling actuator of the vehicle based on the current vehicle state of the vehicle and a target control value of the vehicle in the driving plan, such that the vehicle state of the vehicle becomes a target vehicle state corresponding to the target control value;
    controlling the traveling actuator based on the instruction value for control; and
    setting a control mode of the driving control,
    wherein the step of setting the control mode includes the steps of:
    determining whether a predetermined condition in which tracking performance of a vehicle state with respect to the target vehicle state is reduced is satisfied; and
    switching the control mode from a normal mode to a temporary mode when it is determined that the predetermined condition is satisfied,
        wherein, in the normal mode, the instruction value for control is calculated using the current vehicle state and the target control value in the driving plan, wherein, in the temporary mode, generation of the driving plan is stopped, update or reference of the driving plan generated while it is determined that the predetermined condition is satisfied is prohibited, or correction of the instruction value for control calculated using the target control value and the current vehicle state in the driving plan generated while it is determined that the predetermined condition is satisfied is performed.

8. The method according to claim 7,
wherein the step of setting the control mode further includes the steps of:
determining whether or not a limiting condition for limiting switching to the temporary mode is satisfied when it is determined that the predetermined condition is satisfied; and
stopping switching from the normal mode to the temporary mode when it is determined that the limiting condition is satisfied.

* * * * *